United States Patent
Wiese (10) Patent No.: US 7,953,163 B2
(45) Date of Patent: May 31, 2011

(54) BLOCK LINEAR EQUALIZATION IN A MULTICARRIER COMMUNICATION SYSTEM

(75) Inventor: Brian Wiese, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 1744 days.

(21) Appl. No.: 11/131,392

(22) Filed: May 16, 2005

(65) Prior Publication Data

US 2006/0126747 A1    Jun. 15, 2006

Related U.S. Application Data

(60) Provisional application No. 60/632,019, filed on Nov. 30, 2004.

(51) Int. Cl.
*H04L 5/12* (2006.01)
(52) U.S. Cl. .......................... 375/260; 375/233; 708/323
(58) Field of Classification Search .................. 375/260, 375/229, 222; 370/430; 708/323; 455/61
See application file for complete search history.

(56) References Cited

U.S. PATENT DOCUMENTS

| 4,024,359 A | 5/1977 | DeMarco et al. |
| 4,024,360 A | 5/1977 | Biraghi et al. |
| 4,173,714 A | 11/1979 | Bloch et al. |
| 4,384,355 A | 5/1983 | Werner |
| 4,679,227 A | 7/1987 | Hughes-Hartogs |
| 4,733,389 A | 3/1988 | Puvogel |
| 4,845,466 A | 7/1989 | Hariton et al. |
| 4,882,733 A | 11/1989 | Tanner |
| 4,977,591 A | 12/1990 | Chen et al. |
| 5,285,474 A | 2/1994 | Chow et al. |
| 5,304,940 A | 4/1994 | Harasawa et al. |
| 5,483,551 A | 1/1996 | Huang et al. |
| 5,524,125 A | 6/1996 | Tsujimoto |
| 5,555,274 A | 9/1996 | Sheets |
| 5,559,890 A | 9/1996 | Obermeier et al. |
| 5,596,258 A | 1/1997 | Kimura et al. |
| 5,596,439 A | 1/1997 | Dankberg et al. |
| 5,627,859 A | 5/1997 | Parr |
| 5,703,904 A | 12/1997 | Langberg |
| 5,768,473 A | 6/1998 | Eatwell et al. |

(Continued)

FOREIGN PATENT DOCUMENTS

EP    0 377 965    7/1989

(Continued)

OTHER PUBLICATIONS

Arslan et al. "Equalization for Discrete Multitone Transceivers to maximize bit rate", Dec. 2001,"IEEE Transactions on signal processing", vol. 49 No. 12, pp. 3123-3135.*

(Continued)

*Primary Examiner* — David C. Payne
*Assistant Examiner* — Rahel Guarino
(74) *Attorney, Agent, or Firm* — Sterne, Kessler, Goldstein & Fox P.L.L.C.

(57) ABSTRACT

A method and apparatus for channel equalization in a multi-carrier communication system. The method may include receiving a symbol having multiple sub-carriers and reducing an error on at least one of the sub-carriers of the symbol by adding to it, one or more weighted multiples of other sub-carriers. The added weighted multiples may be from neighboring sub-carriers in the same symbol and/or from other symbols in a tone, for example, a previous or next symbol. The apparatus may include a reduced-complexity block linear equalizer.

22 Claims, 6 Drawing Sheets

U.S. PATENT DOCUMENTS

| | | | |
|---|---|---|---|
| 5,815,538 A | 9/1998 | Grell et al. | |
| 5,818,872 A | 10/1998 | Gupta | |
| 5,844,940 A | 12/1998 | Goodson et al. | |
| 5,852,630 A | 12/1998 | Langberg et al. | |
| 5,867,539 A | 2/1999 | Koslov | |
| 5,901,205 A | 5/1999 | Smith et al. | |
| 5,909,178 A | 6/1999 | Balch et al. | |
| 5,930,268 A | 7/1999 | Kurby et al. | |
| 5,952,914 A | 9/1999 | Wynn | |
| 5,974,098 A | 10/1999 | Tsuda | |
| 5,978,373 A | 11/1999 | Hoff et al. | |
| 6,006,083 A | 12/1999 | Tong et al. | |
| 6,014,376 A | 1/2000 | Abreu et al. | |
| 6,052,420 A | 4/2000 | Yeap et al. | |
| 6,118,769 A | 9/2000 | Pries et al. | |
| 6,147,963 A | 11/2000 | Walker et al. | |
| 6,161,209 A | 12/2000 | Moher | |
| 6,185,429 B1 | 2/2001 | Gehrke et al. | |
| 6,205,220 B1 | 3/2001 | Jacobsen et al. | |
| 6,205,410 B1 | 3/2001 | Cai | |
| 6,212,227 B1 | 4/2001 | Ko et al. | |
| 6,226,322 B1 * | 5/2001 | Mukherjee | 375/229 |
| 6,256,326 B1 | 7/2001 | Kudo | |
| 6,266,347 B1 | 7/2001 | Amrany et al. | |
| 6,266,422 B1 | 7/2001 | Ikeda | |
| 6,295,323 B1 | 9/2001 | Gabara | |
| 6,345,071 B1 | 2/2002 | Hamdi | |
| 6,351,509 B1 | 2/2002 | Vitenberg et al. | |
| 6,359,926 B1 | 3/2002 | Isaksson | |
| 6,363,109 B1 | 3/2002 | Polley et al. | |
| 6,378,234 B1 | 4/2002 | Luo | |
| 6,411,657 B1 | 6/2002 | Verbin et al. | |
| 6,433,819 B1 | 8/2002 | Li et al. | |
| 6,445,773 B1 | 9/2002 | Liang et al. | |
| 6,456,673 B1 | 9/2002 | Wiese et al. | |
| 6,459,739 B1 | 10/2002 | Vitenberg | |
| 6,466,588 B1 | 10/2002 | Michaels | |
| 6,493,395 B1 | 12/2002 | Isaksson et al. | |
| 6,498,808 B1 | 12/2002 | Tzannes | |
| 6,507,608 B1 | 1/2003 | Norrell | |
| 6,519,291 B1 | 2/2003 | Dagdeviren et al. | |
| 6,542,028 B1 | 4/2003 | Norrell et al. | |
| 6,546,025 B1 | 4/2003 | Dupuy | |
| 6,556,635 B1 | 4/2003 | Dehghan | |
| 6,597,732 B1 | 7/2003 | Dowling | |
| 6,621,346 B1 | 9/2003 | Nabicht et al. | |
| 6,631,175 B2 * | 10/2003 | Harikumar et al. | 375/350 |
| 6,633,545 B1 | 10/2003 | Milbrandt | |
| 6,674,795 B1 | 1/2004 | Liu et al. | |
| 6,690,666 B1 | 2/2004 | Norrell et al. | |
| 6,721,394 B1 | 4/2004 | Murphy et al. | |
| 6,731,914 B2 | 5/2004 | Creigh et al. | |
| 6,738,418 B1 | 5/2004 | Stiscia et al. | |
| 6,754,170 B1 | 6/2004 | Ward | |
| 6,763,061 B1 | 7/2004 | Strait et al. | |
| 6,775,241 B1 | 8/2004 | Levin | |
| 6,791,995 B1 | 9/2004 | Azenkot et al. | |
| 6,798,735 B1 | 9/2004 | Tzannes et al. | |
| 6,822,998 B1 | 11/2004 | Yun et al. | |
| 6,826,404 B2 | 11/2004 | Delfs et al. | |
| 6,839,429 B1 | 1/2005 | Gaikwad et al. | |
| 6,859,488 B2 | 2/2005 | Azenkot et al. | |
| 6,871,066 B1 | 3/2005 | Khullar et al. | |
| 6,898,236 B1 | 5/2005 | Sun | |
| 6,940,973 B1 | 9/2005 | Yeap et al. | |
| 6,965,636 B1 | 11/2005 | DesJardins et al. | |
| 6,999,504 B1 | 2/2006 | Amrany et al. | |
| 6,999,507 B2 | 2/2006 | Jin | |
| 7,023,910 B1 | 4/2006 | Norrell | |
| 7,031,669 B2 | 4/2006 | Vaidyanathan et al. | |
| 7,035,661 B1 | 4/2006 | Yun | |
| 7,085,315 B1 * | 8/2006 | Kelton | 375/219 |
| 7,085,539 B2 | 8/2006 | Furman | |
| 7,120,211 B2 | 10/2006 | Shmulyian et al. | |
| 7,155,007 B1 | 12/2006 | Upton | |
| 7,174,022 B1 | 2/2007 | Zhang et al. | |
| 7,177,419 B2 | 2/2007 | Sedarat et al. | |
| 7,184,467 B2 * | 2/2007 | Jacobsen et al. | 375/222 |
| 7,200,196 B2 | 4/2007 | Li et al. | |
| 7,215,727 B2 | 5/2007 | Yousef et al. | |
| 7,221,722 B2 | 5/2007 | Thomas et al. | |
| 7,260,117 B2 * | 8/2007 | Long et al. | 370/503 |
| 7,283,509 B2 | 10/2007 | Moon et al. | |
| 7,283,598 B2 * | 10/2007 | Akita et al. | 375/316 |
| 7,302,379 B2 | 11/2007 | Cioffi et al. | |
| 7,315,592 B2 | 1/2008 | Tsatsanis et al. | |
| 7,315,967 B2 | 1/2008 | Azenko et al. | |
| 7,330,544 B2 * | 2/2008 | D'Angelo et al. | 379/399.01 |
| 7,356,049 B1 | 4/2008 | Rezvani | |
| 7,366,258 B2 | 4/2008 | Kolze et al. | |
| 7,369,607 B2 | 5/2008 | Sedarat | |
| 7,421,015 B2 | 9/2008 | Sedarat | |
| 7,433,395 B2 | 10/2008 | Sedarat | |
| 7,443,916 B2 | 10/2008 | Sedarat et al. | |
| 7,502,336 B2 | 3/2009 | Romano et al. | |
| 7,529,984 B2 | 5/2009 | Heise | |
| 7,555,037 B2 | 6/2009 | Sedarat | |
| 7,630,489 B2 * | 12/2009 | Oksman et al. | 379/392.01 |
| 2001/0009850 A1 | 7/2001 | Kushige | |
| 2001/0011019 A1 | 8/2001 | Jokimies | |
| 2001/0055332 A1 | 12/2001 | Sadjadpour et al. | |
| 2002/0001340 A1 | 1/2002 | Shenoi et al. | |
| 2002/0044597 A1 | 4/2002 | Shively et al. | |
| 2002/0057713 A1 | 5/2002 | Bagchi et al. | |
| 2002/0078247 A1 | 6/2002 | Lu et al. | |
| 2002/0122515 A1 | 9/2002 | Bodenschatz | |
| 2002/0154620 A1 | 10/2002 | Azenkot et al. | |
| 2002/0163959 A1 | 11/2002 | Haddad | |
| 2003/0021240 A1 | 1/2003 | Moon et al. | |
| 2003/0035469 A1 | 2/2003 | Frank et al. | |
| 2003/0043925 A1 | 3/2003 | Stopler et al. | |
| 2003/0048368 A1 | 3/2003 | Bosco et al. | |
| 2003/0055996 A1 | 3/2003 | Mori et al. | |
| 2003/0091053 A1 | 5/2003 | Tzannes et al. | |
| 2003/0099285 A1 | 5/2003 | Graziano et al. | |
| 2003/0099286 A1 | 5/2003 | Graziano et al. | |
| 2003/0099350 A1 | 5/2003 | Bostoen et al. | |
| 2003/0108094 A1 | 6/2003 | Lai et al. | |
| 2003/0112860 A1 | 6/2003 | Erdogan | |
| 2003/0112887 A1 * | 6/2003 | Sang et al. | 375/285 |
| 2003/0124983 A1 | 7/2003 | Parssinen et al. | |
| 2003/0185176 A1 | 10/2003 | Lusky et al. | |
| 2003/0206579 A1 | 11/2003 | Bryant | |
| 2003/0227967 A1 | 12/2003 | Wang et al. | |
| 2004/0057502 A1 | 3/2004 | Azenkot et al. | |
| 2004/0066865 A1 | 4/2004 | Yousef et al. | |
| 2004/0071240 A1 * | 4/2004 | Betts | 375/346 |
| 2004/0087278 A1 | 5/2004 | Lin et al. | |
| 2004/0091025 A1 | 5/2004 | Sindhushayana et al. | |
| 2004/0111345 A1 | 6/2004 | Chuang et al. | |
| 2004/0141548 A1 | 7/2004 | Shattil | |
| 2004/0156441 A1 | 8/2004 | Peeters et al. | |
| 2004/0176063 A1 | 9/2004 | Choi | |
| 2004/0185852 A1 | 9/2004 | Son et al. | |
| 2004/0213170 A1 | 10/2004 | Bremer | |
| 2004/0223449 A1 | 11/2004 | Tsuie et al. | |
| 2005/0041753 A1 | 2/2005 | Cunningham | |
| 2005/0047489 A1 | 3/2005 | Yousef et al. | |
| 2005/0047514 A1 | 3/2005 | Bolinth et al. | |
| 2005/0053229 A1 | 3/2005 | Tsatsanis et al. | |
| 2005/0094550 A1 * | 5/2005 | Huh et al. | 370/203 |
| 2005/0099967 A1 | 5/2005 | Baba | |
| 2005/0111561 A1 | 5/2005 | Sedarat et al. | |
| 2005/0143008 A1 | 6/2005 | Bailey | |
| 2005/0159128 A1 | 7/2005 | Collins et al. | |
| 2005/0169357 A1 | 8/2005 | Sedarat | |
| 2005/0190825 A1 | 9/2005 | Sedarat | |
| 2005/0190848 A1 | 9/2005 | Kiyanagii et al. | |
| 2005/0190871 A1 | 9/2005 | Sedarat | |
| 2005/0216441 A1 | 9/2005 | Thomas et al. | |
| 2005/0271129 A1 | 12/2005 | Reina | |
| 2005/0276355 A1 | 12/2005 | Chow et al. | |
| 2006/0002457 A1 | 1/2006 | Romano et al. | |
| 2006/0019687 A1 | 1/2006 | Garg et al. | |
| 2006/0039550 A1 | 2/2006 | Chadha et al. | |
| 2006/0062379 A1 | 3/2006 | Sedarat et al. | |
| 2006/0067388 A1 | 3/2006 | Sedarat et al. | |

| | | |
|---|---|---|
| 2006/0078044 A1 | 4/2006 | Norrell et al. |
| 2006/0083321 A1 | 4/2006 | Sedarat |
| 2006/0083322 A1 | 4/2006 | DesJardins et al. |
| 2006/0083323 A1 | 4/2006 | DesJardins et al. |
| 2006/0083324 A1 | 4/2006 | DesJardins et al. |
| 2006/0115030 A1 | 6/2006 | Erving et al. |
| 2006/0171480 A1 | 8/2006 | Erving et al. |
| 2006/0193390 A1 | 8/2006 | Sedarat |
| 2006/0203843 A1 | 9/2006 | Liu |
| 2006/0222098 A1 | 10/2006 | Sedarat et al. |
| 2006/0227913 A1 | 10/2006 | Sedarat |
| 2006/0253515 A1 | 11/2006 | Sedarat |
| 2006/0291537 A1 | 12/2006 | Fullerton et al. |
| 2007/0002940 A1 | 1/2007 | Zhou |
| 2007/0183526 A1 | 8/2007 | Norrell et al. |
| 2007/0217492 A1 | 9/2007 | Cox et al. |

FOREIGN PATENT DOCUMENTS

| | | |
|---|---|---|
| EP | 0 844 758 A2 | 5/1998 |
| EP | 0 966 134 A2 | 12/1999 |
| EP | 1 389 846 A2 | 2/2004 |
| EP | 1 388 944 A1 | 4/2004 |
| WO | WO 2006/042274 | 4/2006 |

OTHER PUBLICATIONS

Karp et al. "Zero-forcing frequency domain equalization for DMT systems with insufficient guard interval",2003, IEEE ICASSP,pp. 221-224.*

International Telecommunication Union (ITU) Recommendation G.992.1, Asymmetric digital subscriber line transceivers (G.MDT), (Jun. 1999).

International Telecommunication Union (ITU) Recommendation G.992.3, Asymmetric digital subscriber line transceivers—2 (ADSL 2), (Jul. 2002).

International Telecommunication Union (ITU) Recommendation G.993.1, Very high speed digital subscriber line (VDSL), (Jun. 2004).

"Multicarrier Bit-Loading in Presence of Biased Gaussian Noise Sources", Hossein Sedarat, Benjamin Miller, Kevin Fisher, 5 pages, presented in IEEE Consumer Communication and Networking Conference, Jan. 2005.

"A Practical Discrete Multitone Transceiver Loading Algorithm for Data Transmission Over Spectrally Shaped Channels", P.S. Chow, J.M. Cioffi, and J.A.C. Bingham, IEEE Trans. on Communications, vol. 43, No. 2, pp. 773-775, 1995.

"Optimal Discrete Bit Loading for Multicarrier Modulation Systems," J. Campello, IEEE International Symposium on Information Theory, Aug. 1998, Cambridge MA.

"Computationally Efficient Optimal Power Allocation Algorithms for Multicarrier Communication Systems," B.S. Krongold, K. Ramchandran, D.L. Jones, IEEE Trans. on Communications, vol. 48, pp. 23-27, Jan. 2000.

"An Efficient Bit-Loading Algorithm for DMT Application", R.V. Sonalkar, IEEE Comm. Letters, vol. 4, pp. 80-82, Mar. 2000.

"Multiuser Constant-Energy Bit Loading for MPSK-Modulated Orthogonal Frequency Division Multiplexing", A.G. Armada, J.M. Cioffi, IEEE Wireless Communications and Networking Conference (WCNC), Orlando, Mar. 2002.

"Adaptive Bit-Loading for Wireless OFDM Systems", A.N. Barreto, S. Furrer, IEEE International Symposium on Personal, Indoor and Mobile Radio Communications, Oct. 2001.

"Novel Efficient Bit-Loading Algorithms for Peak-Energy-Limited ADSL-Type Multicarrier Systems," E. Baccarelli, A. Fasano, M. Biagi, IEEE Trans on Signal Processing, vol. 50, No. 5, May 2002.

"Impulse Noise Protection for Multicarrier Communication Systems", Hossein Sedarat et al., Submitted to IEEE ICASSP (2005).

"A New Loading Algorithm for Discrete Multitone Transmission", Fischer, Robert F.H., et al., 1996, pp. 724-728.

"Impulse Response Shortening for Discrete Multitone Transceivers", Melsa, Peter J.W. et al., IEEE vol. 44, No. 12, Dec. 1996, pp. 1662-1672.

"A Maximum Rate Loading Algorithm for Discrete Multitone Modulation Systems", Leke, Achankeng et al., IEEE 1997, pp. 1514-1518.

"Equalization for Discrete Multitone Transceivers to Maximize Bit Rate", Arslan, G., et al., IEEE, vol. 49, No. 12, Dec. 2001, pp. 3123-3135.

"An Efficient Bit Allocation for Multicarrier Modulation", Wyglinski, Alexander M. et al., IEEE Wireless Communiation, Networking Conference, Atlanta, GA, Mar. 2004, 4 pages.

J. M. Cioffi and G. D. Forney, "Generalized Decision-Feedback Equalization for Packet Transmission with ISI and Gaussian Noise". In Communications, Computation, Control, and Signal Processing, a tribute to Thomas Kailath, pp. 79-127, Kluwer Academic Publishers, 1997.

Ahmed, Nadeem, et al., "Optimal Transmit Spectra for Communication in the Presence of Crosstalk and Imperfect Echo Cancellation," IEEE, p. 17-21, © 2001.

Al-Dhahir, Naofal, et al., "Optimum Finite-Length Equalization for Multicarrier Transceivers," IEEE vol. 44, No. 1, p. 56-64, Jan. 1996.

Bingham, John A.C., et al., "Multicarrier Modulation for Data Transmission: An Idea Whose Time Has Come," IEEE, p. 5-14, May 1990.

Blahut, Richard E., "Theory and Practice of Error Control Codes," Chapter 7: Bose-Chaudhuri-Hocquenghem Codes, 1984.

Blahut, Richard E., "Theory and Practice of Error Control Codes," Chapter 11: Fast Algorithms, 1984.

Communication pursuant to Article 94(3), EPC, 05806662.2-1525, Ref. W3477002EPPWOSv, 2 pages, dated Feb. 26, 2008.

Communication pursuant to Rules 109 and 110 EPC, 05806662.2-1525, PCT/US2005/036655, W3477002EPPWOSv, 4 pages, dated May 21, 2007.

"Draft Standard," Network and Customer Installation Interfaces—Asymmetric Digital Subscriber Line (ADSL) Metallic Interface, Draft American National Standard for Telecommunications, Alliance for Telecommunications Industry Solutions, T1. 413, 1998.

Farhang-Boroujeny, Behrouz, et al., "Design Methods for Time-Domain Equalizers in DMT Transceivers," IEEE, vol. 49, No. 3, p. 554-562, Mar. 2001.

Franklin, Curt, "How DSL Works," How Stuff Works, http://computer.howstuffworks.com/dsl.htm/printable. printed Nov. 16, 2004.

Henkel, Werner, et al., "Maximizing the Channel Capacity of Multicarrier Transmission by Suitable Adaptation of the Time-Domain Equalizer," IEEE, vol. 48, No. 12, Dec. 2000.

International Preliminary Report on Patentability, PCT/US2005/023634 filed Jun. 30, 2005, mailed Jan. 9, 2007.

International Preliminary Report on Patentability (Chapter 1), International Application No. PCT/US2005/036655, International filing date Oct. 11, 2005, mailed Apr. 11, 2007.

International Preliminary Report on Patentability, PCT/US2007/001997, filed Jan. 25, 2007, mailed Aug. 12, 2008.

International Telecommunication Union (ITU) Recommendation G.992.2, "Splitterless asymmetric digital subscriber line (ADSL) transceivers," Series G: Transmission Systems and Media, Digital Systems and Networks, Jun. 1999.

Kamkar-Parsi et al., Wideband Crosstalk Interface Cancelling on xDSL Using Adaptive Signal Processing and Common Mode Signal, IEEE, p. IV-1045-IV-1048, 2004.

Lampe, Lutz H.J., et al., "Performance Evaluation of Non-Coherent Transmission Over Power Lines," 8 pages, 2007.

Lashkarian, Navid, et al., Fast Algorithm for Finite-Length MMSE Equalizers with Application to Discrete Multitone Systems, IEEE, p. 2753-2756, 1999.

Magesacher, Thomas et al., "Adaptive Interference Cancellation Using Common-Mode Information in DSL," Proceedings of European Signal Processing Conference, Sep. 2005.

Magesacher, Thomas et al., "Analysis of Adaptive Interference Cancellation Using Common-Mode Information in Wireline Communications," EURSASIO Journal on Advances in Signal Processing, vol. 2007, Article 84956, Jun. 2007.

Magesacher, Thomas et al., "Information Rate Bounds in Commoon-Mode Aided Wireline Communications," European Transactions on Telecommunications, vol. 17, No. 5, p. 533-545, Oct. 2006.

Milosevic et al., "Simultaneous Multichannel Time Domain Equalizer Design Based on the Maximum Composite Shortening SNR," Dept. of Electrical and Compter Eng., The University of Texas, Austin, Texas, 5 pages, 2002.

Misao, Fukuda et all, "A Line Terminating LSI Using Echo Cancelling Method for ISDN Subscriber Loop Transmission," IEEE Journal on Selected Areas in Communications, vol. 6, No. 3, p. 476-483, Apr. 1988.

Okamura, Yasuka et al., "ADSL System for Time Periodic Noise Environments," XP-00086790, NEC Res. & Develop., vol. 40, No. 1, p. 64-69, Jan. 1999.

PCT International Preliminary Report on Patentability and PCT Written Opinion of the International Searching Authority, PCT/US2005/036655, filing date Oct. 11, 2005, mailed Apr. 11, 2007.

PCT Search Report, International Application No. PCT/US05/23634, International filing date Jun. 30, 2005, mailed May 4, 2006.

PCT Search Report, International Application No. PCT/US2005/036655, International filing date Oct. 11, 2005, mailed Feb. 14, 2006.

PCT Search Report and Written Opinion of the International Searching Authority from the International Searching Authority, International Application No. PCT/US2007/001997, 10 pages, International filing date Jan. 25, 2007, mailed Jul. 18, 2007.

PCT Search Report, International Application No. PCT/US06/10004, International Filing Date Mar. 16, 2006, Mailed Oct. 10, 2007.

PCT Search Report, International Application No. PCT/US06/09687, International Filing Date Mar. 16, 2006, Mailed Nov. 16, 2007.

PCT Search Report, International Application No. PCT/US06/09804, Filing Date Mar. 17, 2006, Mailed Apr. 2, 2008.

PCT Search Report, International Application No. PCT/US09/58821, Filing Date Sep. 29, 2009, Mailed Dec. 2, 2009.

PCT Written Opinion of the International Searching Authority, International Application No. PCT/US05/23634, International filing date Jun. 30, 2005, mailed May 4, 2006.

PCT Written Opinion of the International Searching Authority, International Application No. PCT/US2005/036655, International filing date Oct. 11, 2005, mailed Feb. 10, 2006.

PCT Written Opinion of the International Searching Authority, International Application No. PCT/US06/10004, International Filing Date Mar. 16, 2006, Mailed Oct. 10, 2007.

PCT Written Opinion of the International Searching Authority, International Application No. PCT/US06/09687, International Filing Date Mar. 16, 2006, Mailed Nov. 16, 2007.

PCT Written Opinion of the International Searching Authority, International Application No. PCT/US09/06804, Filing Date Mar. 17, 2006, Mailed Apr. 2, 2008.

PCT Written Opinion of the International Searching Authority, International Application No. PCT/US09/58821, Filing Date Sep. 29, 2009, Mailed Dec. 2, 2009.

Perez-Alvarez, Ivan A., et al., "A Differential Error Reference Adaptive Echo Canceller for Multilevel PAM Line Codes,"Work supported by National Project T1C95-0026, IEEE, p. 1707-1710, © 1996.

Sonalkar, Ranjan, et al., "Shannon Capacity of Frequency-Overlapped Digital Subscriber Loop Channels," IEEE, p. 1741-1745, © 2002.

Starr, Thomas et al., "Understanding Digital Subscriber Line Technology," p. 94-97, 147-154, 206-217, 241-251, and 330-331, Prentice Hall PTR, Upper Saddle River, NJ, 1999.

STLC60134S: TOSCA Integrated ADSL. CMOS Analog Front-End Circuit, Aug. 1999.

Toumpakaris, D. "A byte-erasure method for improved impulse immunity in DSL systems using soft information from an inner code," IEEE International Conference on Communications (ICC), vol. 4, p. 2431-2435, May 2003.

Toumpakaris, D., "A Square Distance-Based Byte-Erasure Method for Reduced-delay Protection of DSL Systems from Non-stationary Interference," IEEE International Conference on Communications (ICC), Vo. 4, p. 2114-2119, San Francisco, CA, Dec. 2003.

Toumpakaris, D., "Reduced Delay Protection of DSL Systems Against Nonstationary Disturbances," IEEE Trans. Communications, vol. 52, No. 11, Nov. 2004.

Wu, Cheng-Shing, et al., "A Novel Cost-Effective Multi-Path Adaptive Interpolated FIR (IFIR)-Based Echo Canceller," IEEE, p. V-453-V-456, © 2000.

Zogakis, T.N., et al., "Impulse Noise Mitigation Strategies for Multicarrier Modulation," Proceedings of the International Conference on Communications (ICC), vol. 3, p. 784-788, May 23, 1993.

Non-Final Office Action dated Oct. 30, 2007, U.S. Appl. No. 11/067,434, filed Feb. 25, 2005, Sedarat.

Final Office Action dated Apr. 29, 2008, U.S. Appl. No. 11/067,434, filed Feb. 25, 2005, Sedarat.

Non-Final Office Action dated Jul. 21, 2008, U.S. Appl. No. 11/067,434, filed Feb. 25, 2005, Sedarat.

Non-Final Office Action dated Jan. 6, 2009, U.S. Appl. No. 11/067,434, filed Feb. 25, 2005, Sedarat.

Non-Final Office Action dated Aug. 19, 2009, U.S. Appl. No. 11/067,434, filed Feb. 25, 2005, Sedarat.

Non-Final Office Action dated Aug. 21, 2008, U.S. Appl. No. 11/248,704, filed Oct. 11, 005, Norrell et al.

Non-Final Office Action dated Feb. 4, 2009, U.S. Appl. No. 11/248,704, filed Oct. 11, 2005, Norrell et al.

Final Office Action dated Aug. 5, 2009, U.S. Appl. No. 11/248,704, filed Oct. 11, 2005, Norrell et al.

Non-Final Office Action dated Nov. 26, 2008, U.S. Appl. No. 11/348,733, filed Feb. 6, 2006, Norrell et al.

Non-Final Office Action dated Apr. 8, 2009, U.S. Appl. No. 11/348,733, filed Feb. 6, 2006, Norrell et al.

Non-Final Office Action dated Oct. 23, 2009, U.S. Appl. No. 11/348,733, filed Feb. 6, 2006, Norrell et al.

Non-Final Office Action dated Feb. 24, 2009, U.S. Appl. No. 11/377,114, filed Mar. 15, 2006, Sedarat.

Final Office Action dated Jul. 31, 2009, U.S. Appl. No. 11/377,114, filed Mar. 15, 2006, Sedarat.

Non-Final Office Action dated Nov. 9, 2007, U.S. Appl. No. 11/377,083, filed Mar. 15, 2006, Sedarat.

Non-Final Office Action dated May 19, 2008, U.S. Appl. No. 11/377,083, filed Mar. 15, 2006, Sedarat.

Notice of Allowance dated May 18, 2009, U.S. Appl. No. 11/377,083, filed Mar. 15, 2006, Sedarat.

Final Office Action dated Dec. 4, 2008, U.S. Appl. No. 11/377,083, filed Mar. 15, 2006, Sedarat.

Non-Final Office Action dated Dec. 11, 2008, U.S. Appl. No. 11/377,084, filed Mar. 15, 2006, Sedarat et al.

Non-Final Office Action dated Aug. 4, 2009, U.S. Appl. No. 11/377,084, filed Mar. 15, 2006, Sedarat et al.

Cioffi, J. et al., "Analog RF Cancelation with SDMT (96-084)," T1E1.4/96-084 contribution, Amati Communications Corporation, Apr. 22, 1996.

* cited by examiner

BLOCK LINEAR EQUALIZATION IN A MULTICARRIER COMMUNICATION SYSTEM

RELATED APPLICATION

This application claims the benefit of U.S. Provisional Application No. 60/632,019, filed Nov. 30, 2004, which is hereby incorporated by reference.

TECHNICAL FIELD

The invention relates generally to a multi-carrier communication system and, more particularly, to channel equalization in a multi-carrier communication system.

BACKGROUND

A multi-carrier communication system, such as a Discrete Multi-Tone (DMT) system in the various types of Digital Subscriber Line, for example, asymmetric digital subscriber line (ADSL) and very high-speed digital subscriber line (VDSL) systems, carries an information bit stream from a transmitter to a receiver. The information bit stream is typically converted into a sequence of data symbols having a number of tones. Each tone may be a group of one or more frequencies defined by a center frequency and a set bandwidth. The tones are also commonly referred to as sub-carriers or sub-channels. Each tone acts as a separate communication channel to carry information between a local transmitter-receiver (transceiver) device and a remote transceiver device.

DMT communication systems, such as ADSL, may experience channel distortion that causes the data symbols to spread. Therefore, there are certain limitations to how close symbols can be lined up next to each other without the use of a channel distortion compensation technique. The effect of channel distortion can be minimized using a channel equalizer.

Figure 1:
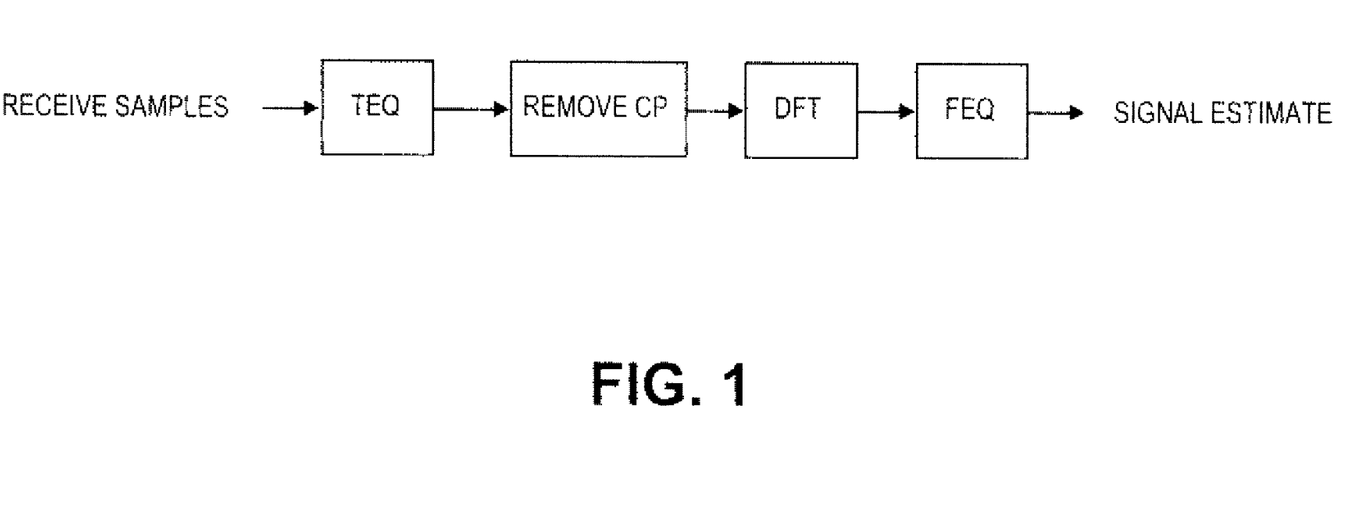
FIG. 1 illustrates a conventional DMT receiver.

FIG. 1 illustrates a conventional DMT receiver. A channel equalizer is used to control the spread of the data symbols after going through the channel. A cyclic prefix (CP) may be employed in such systems to simplify channel equalization to minimize a source of cross channel interference. Generally, if the length of the channel impulse response is equal to or less than the cyclic prefix length plus one sample, then channel equalization is trivial and perfect equalization can be achieved. The channel can be inverted in the frequency domain after a discrete Fourier transform (DFT) by a single complex multiply for each sub-channel. This is usually referred to as frequency-domain equalization (FEQ). Equalization using a traditional FEQ can be expressed mathematically in a matrix format as:

$$\hat{X}_i = F \cdot Y_i$$

where $Y_i$ is the vertical DFT output vector of length N at time i (i.e., the tones) and F is the diagonal matrix of FEQ taps (the last $N/2-1$ elements of $Y_i$ contain redundant information and may be ignored).

In practice, the length of the channel impulse response is often much longer than the cyclic prefix length. This results in inter-symbol interference (ISI) and inter-channel interference (ICI) that reduces the signal-to-noise ratio (SNR) that is achieved. This is almost always the case for ADSL systems. The most common way to equalize the channel in these cases is to use a time-domain equalizer (TEQ) to perform channel shortening. Many different methods can be used for computing the TEQ coefficients. Using a TEQ can significantly improve channel equalization, but rarely eliminates ISI completely. The lower band-edge of the downstream channel in ADSL systems often proves particularly difficult to equalize only using a TEQ.

Alternative equalization methods such as a generalized decision-feedback equalizer (GDFE) can be used for channel equalization of multi-carrier systems such as DMT, but the complexity may be very large when compared to TEQ/DFT/FEQ equalization.

BRIEF DESCRIPTION OF THE DRAWINGS

The present invention is illustrated by way of example, and not by way of limitation, in the figures of the accompanying drawings in which.

DETAILED DESCRIPTION

In the following description, numerous specific details are set forth, such as examples of specific commands, named components, connections, number of frames, etc., in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Thus, the specific details set forth are merely exemplary. The specific details may be varied from and still be contemplated to be within the spirit and scope of the present invention.

Some portions of the description that follow are presented in terms of algorithms and symbolic representations of operations on data that may be stored within a memory and operated on by a processor. These algorithmic descriptions and representations are the means used by those skilled in the art to effectively convey their work. An algorithm is generally conceived to be a self-consistent sequence of acts leading to a desired result. The acts are those requiring manipulation of quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, parameters, or the like.

The following detailed description includes several modules, which will be described below. These modules may be implemented by hardware components, such as logic, or may be embodied in machine-executable instructions, which may be used to cause a general-purpose or special-purpose processor programmed with the instructions to perform the operations described herein. Alternatively, the operations may be performed by a combination of hardware and software. The term "coupled to" as used herein means coupled directly to or indirectly to through one or more intervening components.

A method and apparatus for channel equalization in a multi-carrier communication system is described. The method may include receiving a symbol having multiple sub-carriers and reducing an error on at least one of the sub-carriers of the symbol by adding to it, one or more weighted multiples of other sub-carriers. The added weighted multiples may be from neighboring sub-carriers in the same symbol and/or from other symbols, for example, a previous or next symbol. The method may be implemented with a block linear equalizer (BLE) as described below.

Figure 2:
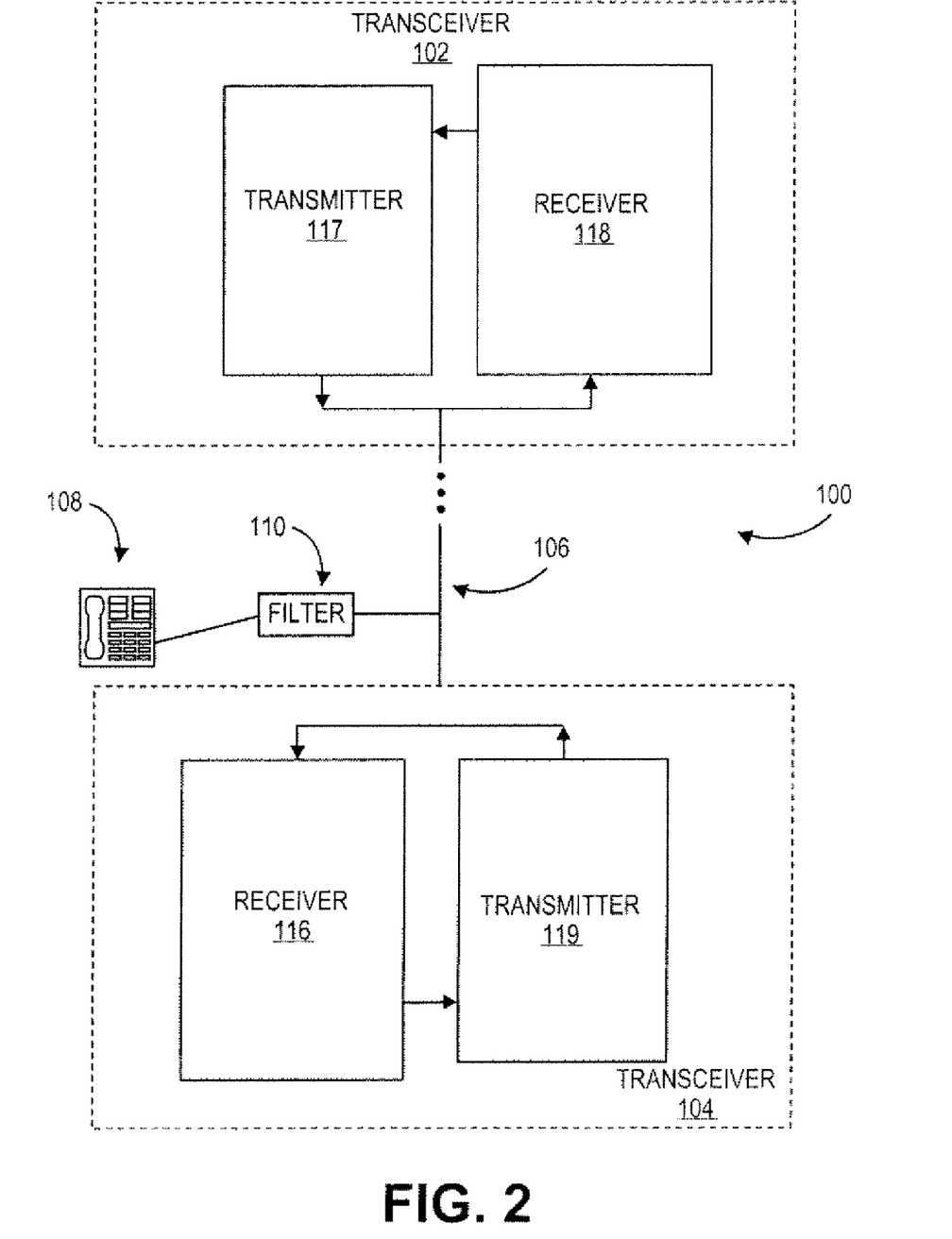
FIG. 2 is a block diagram illustrating of an embodiment of a discrete multi-tone system.

FIG. 2 is a block diagram illustrating an embodiment of a discrete multi-tone system. The discrete multi-tone system 100, such as a Digital Subscriber Line (DSL) based network, may have two or more transceivers 102 and 104, such as a DSL modem in a set top box. In one embodiment, the set top box may be a stand-alone DSL modem. In one embodiment, for example, the set top box employs a DSL mode along with other media components to combine television (Internet Protocol TV or satellite) with broadband content from the Internet to bring the airwaves and the Internet to an end user's TV set. The multiple carrier communication channels may communicate a signal to a residential home. The home may have a home network, such as an Ethernet. The home network may either use the multiple carrier communication signal, directly, or convert the data from the multiple carrier communication signal. The set top box may also include an integrated Satellite and Digital Television Receiver, High-Definition Digital Video Recorder, Digital Media Server and other components.

The first transceiver 102, such as a Discrete Multi-Tone transmitter, transmits and receives communication signals from the second transceiver 104 over a transmission medium 106, such as a telephone line. Other devices such as telephones 108 may also connect to this transmission medium 106. An isolating filter 110 generally exists between the telephone 108 and the transmission medium 106. A training period occurs when initially establishing communications between the first transceiver 102 and a second transceiver 104.

The discrete multi-tone system 100 may include a central office, multiple distribution points, and multiple end users. The central office may contain the first transceiver 102 that communicates with the second transceiver 104 at an end user's location.

Each transmitter portion 117, 119 of the transceivers 102, 104, respectively, may transmit data over a number of mutually independent sub-channels i.e., tones. In a DMT communication system, data samples on each tone are represented as one of a set of finite number of points in a two-dimensional (2D) Quadrature Amplitude Modulation (QAM) constellation. The transmitted data in a multi-carrier system is usually represented by a point from a constellation of finite set of possible data points, regularly distributed over a two dimensional space. Each sub-channel carries only a certain portion of data through QAM of the sub-carrier. The number of information bits loaded on each tone and the size of corresponding QAM constellation may potentially vary from one tone to another and depend generally on the relative power of signal and noise at the receiver. When the characteristics of signal and noise are known for all tones, a bit-loading algorithm may determine the optimal distribution of data bits and signal power amongst sub-channels. Thus, a transmitter portion 117, 119 of the transceivers 102, 104 modulates each sub-carrier with a data point in a QAM constellation.

It should be noted that embodiments of the present invention are described below in reference to receiver 116 for ease of discussion, and that receiver 118 may operate in a similar manner as described below for receiver 116.

Figure 3:
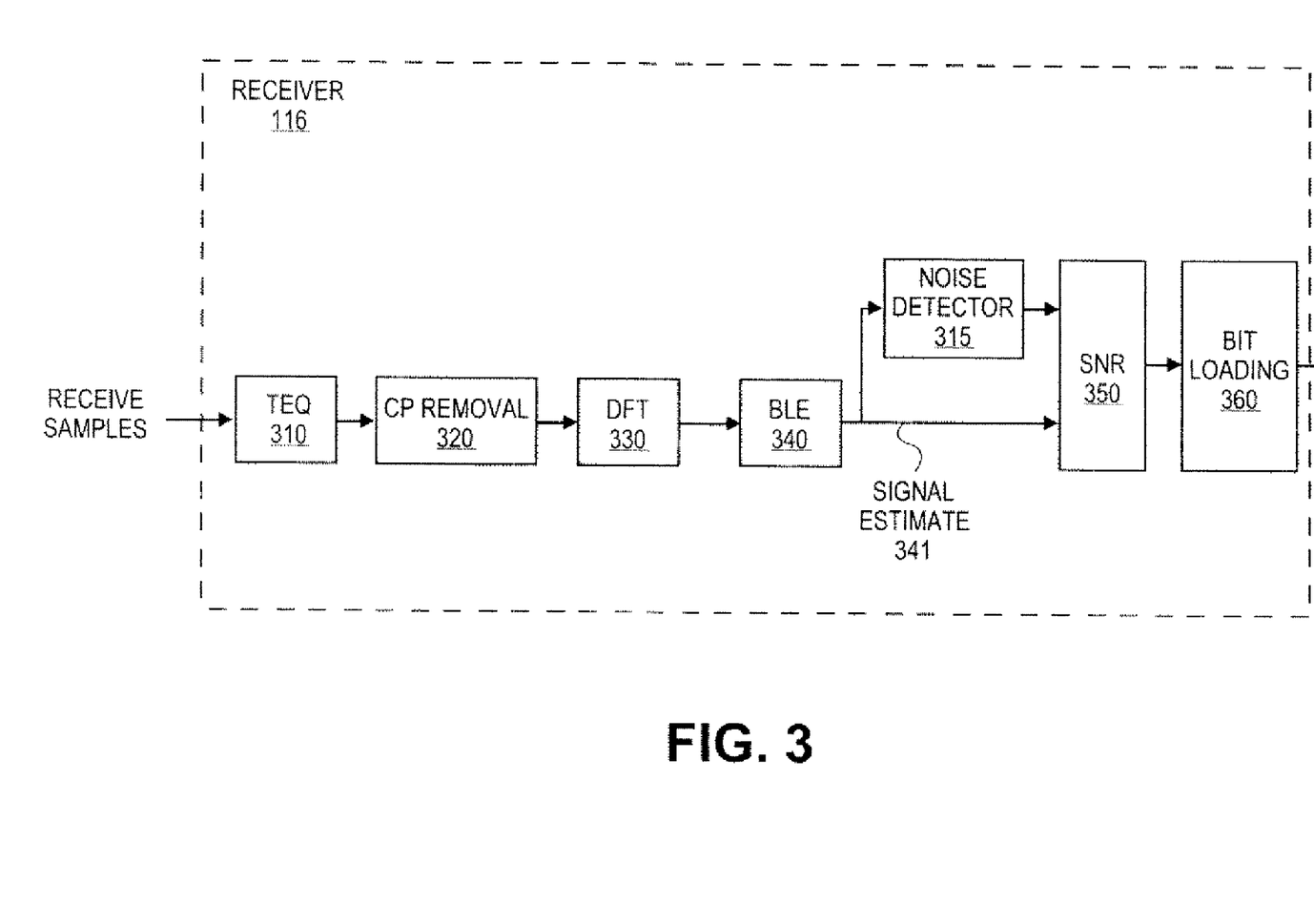
FIG. 3 illustrates one embodiment of a receiver of FIG. 1.

FIG. 3 illustrates one embodiment of a receiver having a block linear equalizer. In this embodiment, receiver 116 may include a TEQ 310, a CP removal module 320, a DFT module 330, a block linear equalizer (BLE) 340, a noise detector 315, signal to noise ratio (SNR) module 350, and a bit loading module 360. Additional modules and functionality may exist in the receiver 116 that are not illustrated so as not to obscure an understanding of embodiments of the present invention. It should be noted that the operations of one or more modules may be incorporated into or integrated with other modules.

Received samples of a multi-tone signal are provided to the TEQ 310 to shorten the channel impulse response to mitigate the inter-symbol interference (ISI). The TEQ reduces ISI from the received signal by shortening the channel impulse response to approximately the width in samples of a guard period generated by the transmitter 117. In an embodiment, the length in samples of the shortened impulse response may equal the duration of the guard period plus one sample. The TEQ 310 may apply an algorithm to minimize the mean square error and inter-symbol interference simultaneously on the multi-tone signal in order to shorten the sample length channel impulse response. TEQ 310 is coupled to a CP removal module 320 that removes the cyclic prefix prior to the DFT module 330.

The DFT module 330 receives the output of the CP removal module 320. The DFT module 330 transforms the data samples of the multi-tone signal from the time-domain to the frequency-domain, such that a stream of data for each sub-carrier may be output from the DFT module 330. Essentially, the DFT module 330 acts as a demodulator to separate data corresponding to each tone in the multi-tone signal. Processing of each sub-carrier may be performed in parallel or in series.

In this embodiment, the DFT module 330 is directly coupled to a block linear equalizer (BLE) 340. The resultant signal from the DFT module 330 is sent to BLE 340. The output signal 341 from the BLE 340 is an estimate of the transmitted signal. SNR module 350 is coupled to BLE 340 to receive the signal estimate and noise detector 315 to receive the detected noise. The signal estimate is compared to detected noise to determine a signal to noise ratio (SNR) that is used in performing bit loading. The signal-to-noise ratio is provided to bit-loading module 360 to determine bit-loading for all sub-carriers. The bit rate for a tone determined by the bit-loading module 360 may then be transmitted, using transmitter portion 119, to the transceiver 102 (e.g., at a central office) to enable the transmitter 117 of transceiver 102 to know how many bits to use on each tone. A TEQ, CP removal module, DFT module, noise detector, SNR module and bit-loading module are known in the art; accordingly, a more detailed discussion is not provided.

In this embodiment, equalization using BLE 340 may be expressed mathematically in a matrix format as:

$$\hat{X}_i = \sum_{k=-m}^{k=n} W_k \cdot Y_{i+k}$$

where $Y_i$ is the DFT output vector of length N and $W_k$ are the N-by-N BLE matrices whose diagonal values are referred to as frequency taps. For practical DMT systems, the channel impulse response is shorter than a DMT symbol. In this case, the BLE matrices $W_k$ are zero matrices for $|k|>1$ since ISI is only from the neighboring symbols. The BLE becomes:

$$\hat{X}_i = W_{-1} \cdot Y_{i-1} + W_0 \cdot Y_i + W_1 \cdot Y_{i+1}$$

The matrix $W_0$ replaces the diagonal FEQ matrix F of the conventional receiver structured discussed above in regards to FIG. 1.

Figure 4:
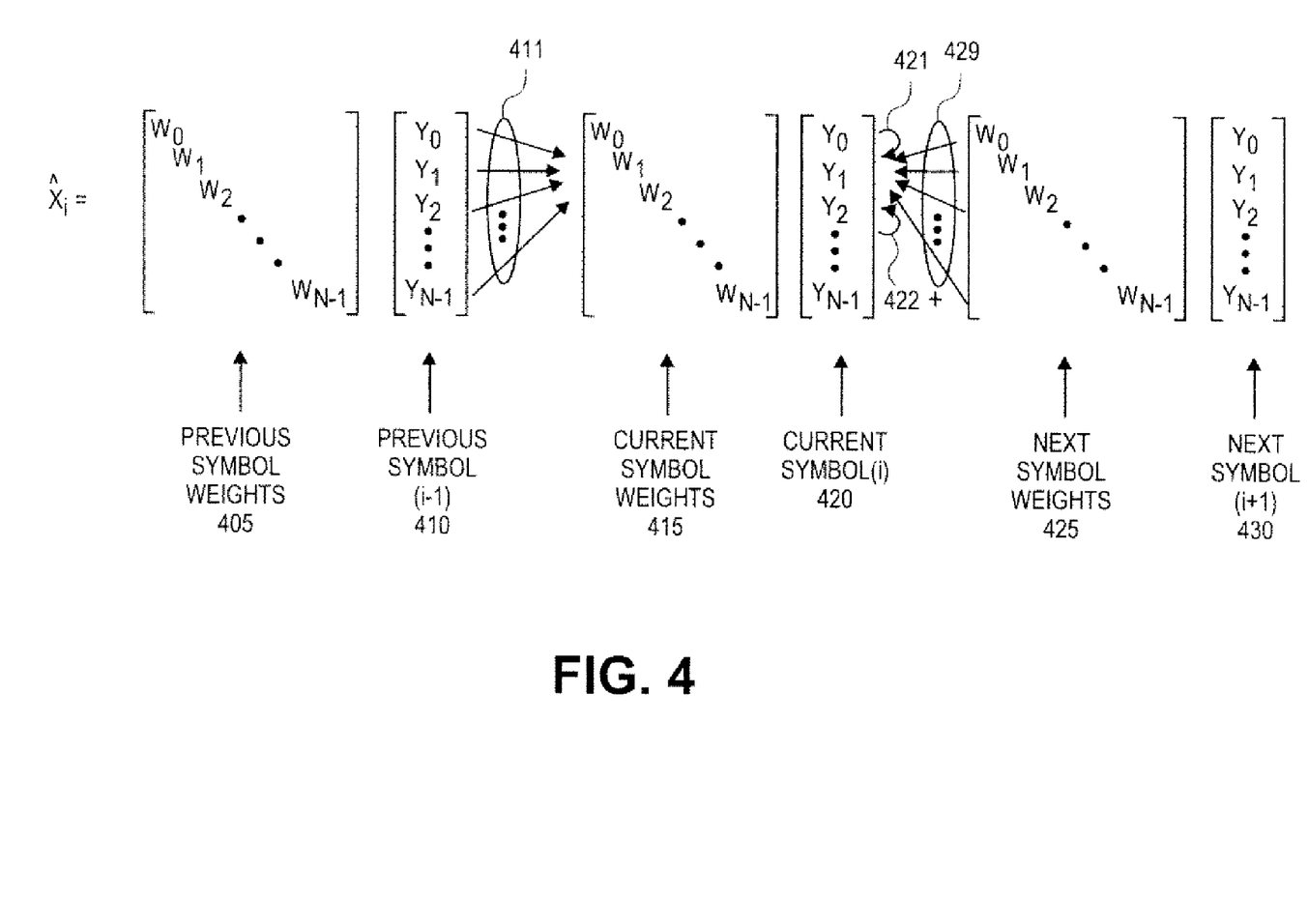
FIG. 4 is a conceptual illustration of one embodiment of channel equalization.
Figure 5:
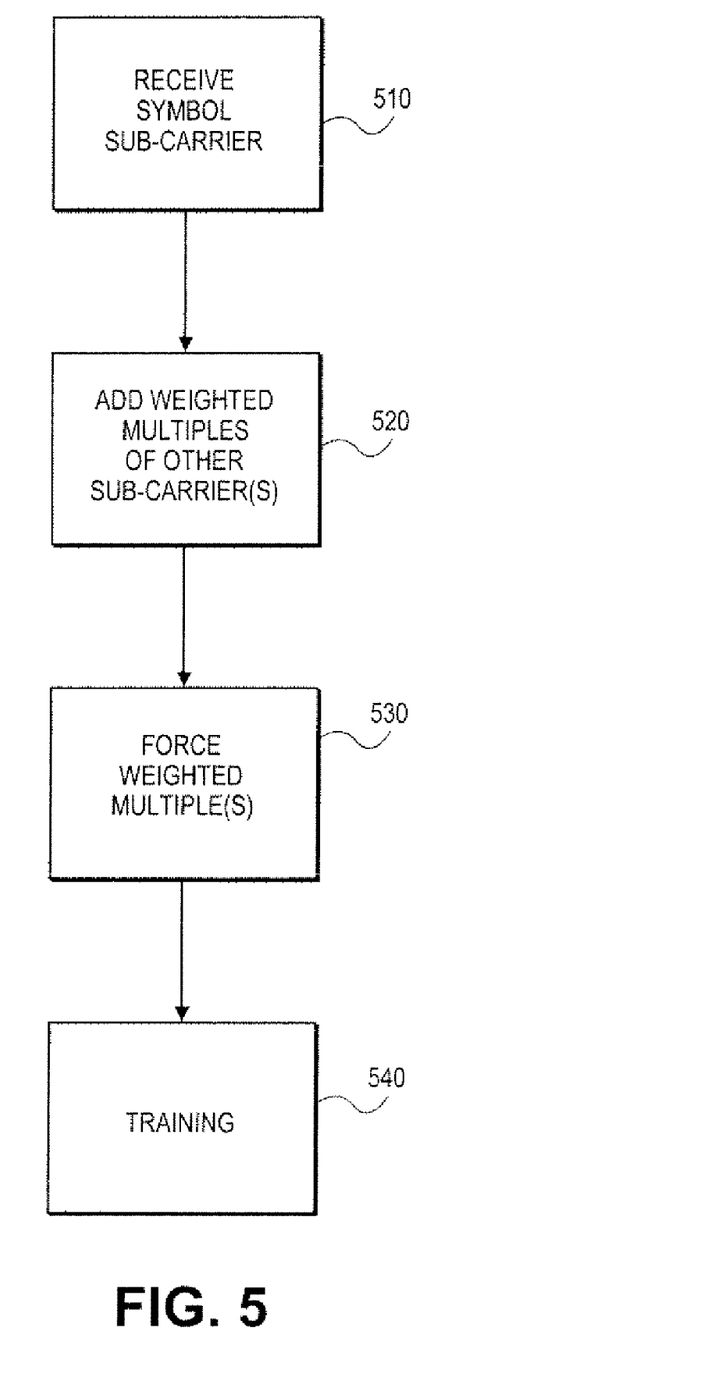
FIG. 5 illustrates one embodiment of a method of channel equalization.

FIG. 4 is a conceptual illustration of the operation of the block linear equalizer discussed in regards to the method of FIG. 5. FIG. 4 illustrates a previous symbol 410 at a previous time, a current symbol 420 at a current time, and a next symbol at a future time. Each of the symbols contain tones $Y_0$-$Y_{N-1}$, where $Y_0$ represents a lower tone sub-carrier and $Y_{N-1}$ represents a higher tone sub-carrier. In this embodiment, the method of block linear equalization includes receiving a current symbol 420 having a plurality of sub-carriers (e.g., $Y_0$-$Y_{N-1}$ of symbol 420), step 510. Next, the method reduces an error on at least one sub-carrier (e.g., $Y_1$ of symbol 420) of the plurality of sub-carriers (e.g., $Y_0$-$Y_{N-1}$ of symbol 420) by adding one or more weighted multiples of one or more other sub-carriers to the sub-carrier being operated on (e.g., $Y_1$ of symbol 420), step 520. In one embodiment, the one or more weighted multiples are added from neighboring sub-carriers in the current symbol (e.g., weighted multiple $W_0Y_0$ 421, weighted multiple $W_2Y_2$ 422, etc.). In such an embodiment, the error for a sub-carrier (e.g., $Y_1$ of symbol 420) may also be reduced by adding one or more weighted multiples from other symbols, for example, weighted multiples 411 previous symbol 410 and/or weighted multiples 429 from next symbol 430.

In an alternative embodiment, the one or more weighted multiples that are added to a sub-carrier being operated on (e.g., $Y_1$ of symbol 420), in step 520, may correspond to a previous symbol's weighted multiples 411 and/or next symbol's weight multiples 429.

The method may also include allowing or forcing one or more of the weighted multiples to a predetermined value, step 530. In one embodiment, at least one of the weighted multiples is allowed or forced to zero. In another embodiment, approximately twenty of the weighted multiples corresponding to lowest used tones are allowed or forced to zero. In yet another embodiment, approximately ten to twenty of the weight multiples are allowed or forced to be non-zero, and the rest are forced to zero.

The method may also include training the one or more weighted multiples, step 540. Training may be performed using a least-mean squares algorithm as discussed below in further detail.

Figure 6:
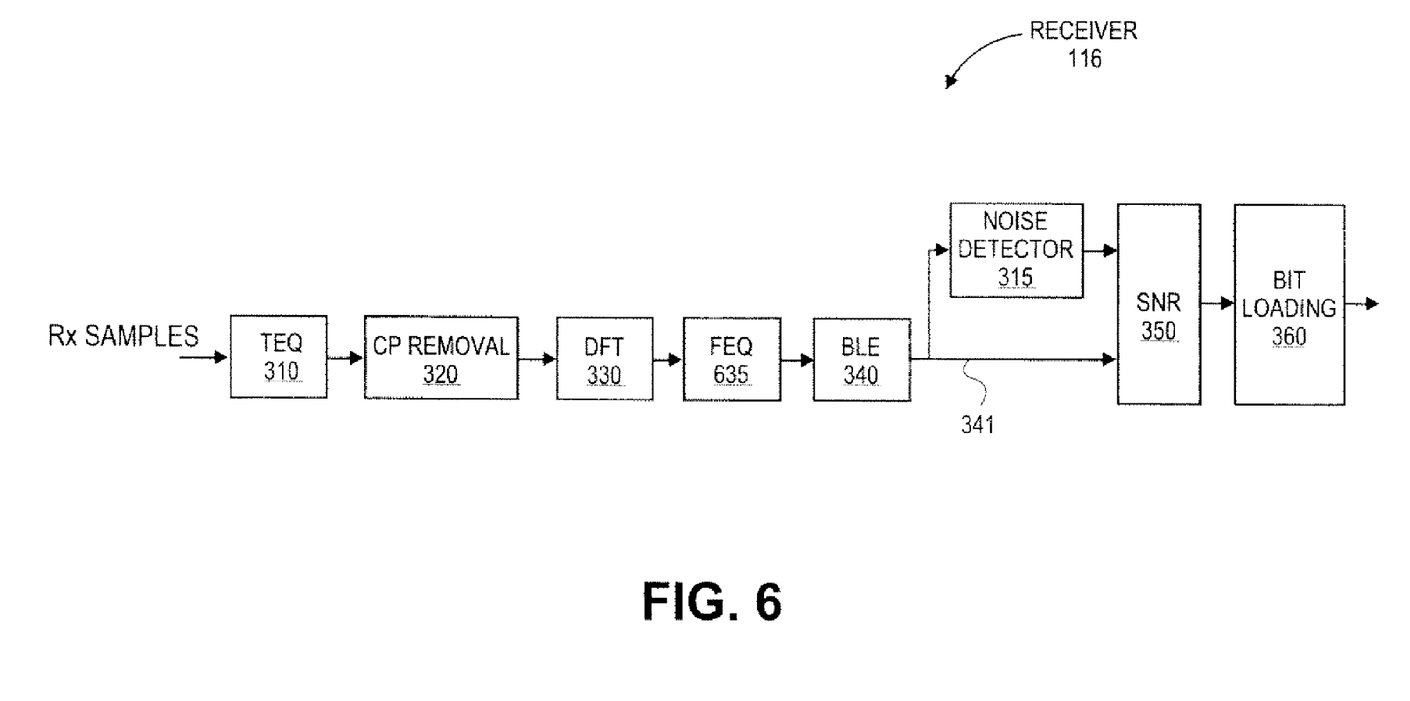
FIG. 6 illustrates an alternative embodiment of the receiver of FIG. 1.

FIG. 6 illustrates an alternative embodiment of a receiver having a block linear equalizer. In this embodiment, receiver 116 may include a TEQ 310, a CP removal module 320, a DFT module 330, a FEQ 635, and a BLE 340. In this embodiment, BLE 340 is implemented as a separate block from the module performing frequency-domain equalization, FEQ 655.

In this embodiment, the frequency-domain equalization and block linear equalization functions are described mathematically in a matrix format as:

$$\hat{X}_i = W_{-1} \cdot F \cdot Y_{i-1} + W_0 \cdot F \cdot Y_i + W_1 \cdot F \cdot Y_{i+1}$$

where F is again the diagonal FEQ matrix.

A block linear equalizer (BLE) for equalization for DMT systems has been described. For DMT systems with a large number of tones (large N), the complexity of a BLE can be very large. However, it is often the case that the majority of ISI and ICI around the low-frequency band edge are caused by other low-frequency tones. That is, only the tones around the lower band edge (e.g., lowest 15 tones) significantly contribute to the error. This allows the use of BLE matrices that are not full (e.g., very sparse BLE matrices) that dramatically reduce the implementation complexity. Some portion of the off-diagonal elements in the W matrices is allowed to be non-zero.

For example, consider an ADSL downstream channel using 256 sub-carriers (N=512). The lowest tone (e.g., first usable tone) is usually 33 for non-overlapped ADSL. The implementation of the BLE described herein would require 3*512*(512/2)=393216 complex multiplies per DMT symbol. With a modest TEQ, assume significant residual ISI and ICI at the lower band edge is restricted to the lowest 15 tones and is primarily caused by the same 15 tones. In one embodiment, the BLE matrices may be restricted to 15×15 nonzero elements (except for the $W_0$ matrix which contains the FEQ taps on the diagonal). The complexity is reduced to 3*15*15=675 complex multiplies per DMT symbol.

Various methods may be used to compute the BLE taps. In one embodiment, a least-mean squares (LMS) algorithm may be used. Using LMS, BLE matrix taps are iteratively updated as:

$$W_{k,i+1} = W_{k,i} + \mu \cdot e_i \cdot Y^*_{i+k}$$

where $$e_i = X_i - \hat{X}_i$$

is the vector of error estimates at time i.

In one embodiment, only the elements of the matrices $W_k$ that are designated to be non-zero are updated. It should be noted that computation of the BLE taps is not limited to use of a LMS algorithm. In an alternative embodiment, another adaptive algorithm may be used to compute the BLE taps.

The BLE described herein may substantially improve channel equalization with low complexity. The BLE may be an extension of a conventional FEQ equalization for DMT systems and, therefore, a fairly adaptable to existing architectures. Furthermore, embodiments of the BLE described herein are conducive to real-time updates to adapt to changes in the channel over time.

In one embodiment, the methods described above may be embodied onto a machine-readable medium. A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; DVD's, electrical, optical, acoustical or other form of propagated signals (e.g., carrier waves, infrared signals, digital signals, EPROMs, EEPROMs, FLASH, magnetic or optical cards, or any type of media suitable for storing electronic instructions. The information representing the apparatuses and/or methods stored on the machine-readable medium may be used in the process of creating the apparatuses and/or methods described herein.

While some specific embodiments of the invention have been shown the invention is not to be limited to these embodiments. The invention is to be understood as not limited by the specific embodiments described herein, but only by scope of the appended claims.

What is claimed is:

1. A method of channel equalization in a multi-carrier communication system, comprising:
receiving a first symbol, a second symbol, and a third symbol, each of the first, the second, and the third symbols being modulated onto a plurality of sub-carriers; and
reducing an error on at least one first sub-carrier from among the plurality of sub-carriers by adding at least one first weighted multiple of at least one second sub-carrier from among the plurality of sub-carriers and at least one second weighted multiple of at least one third sub-carrier from among the plurality of sub-carriers to the at least one first sub-carrier, the at least one second sub-carrier corresponding to at least one subcarrier of the second symbol and the at least one third sub-carrier corresponding to at least one subcarrier of the third symbol.

2. The method of claim 1, wherein the first symbol is a current symbol in time, the second symbol is a previous symbol in time, and the third symbol is a next symbol in time.

3. A multi-tone receiver for detecting data in a multi-tone signal, comprising:
a discrete Fourier transform module;
a block linear equalizer, coupled to the discrete Fourier transform module, configured to reduce an error on at least one sub-carrier of a first plurality of sub-carriers of a first symbol in a frequency domain by adding at least one weighted multiple of at least one other sub-carrier from among the first plurality of sub-carriers to the at least one sub-carrier and at least one weighted multiple of a second plurality of sub-carriers of a second symbol, wherein the first symbol and the second symbol are from different times; and
a frequency-domain equalization module, wherein the block linear equalizer is coupled to the discrete Fourier transform module through the frequency-domain equalization module.

4. The multi-tone receiver of claim 3, wherein the multi-tone receiver is implemented as part of a digital subscriber line modem.

5. The multi-tone receiver of claim 3, wherein the multi-tone receiver is implemented as part of a set top box.

6. The multi-tone receiver of claim 3, wherein the multi-tone receiver is coupled to a transmitter.

7. A method of channel equalization in a multi-carrier communication system, comprising:
receiving, by a multi-carrier receiver implemented as part of the multi-carrier communication system, a first symbol having a first plurality of sub-carriers;
reducing, by the multi-carrier receiver, an error on at least one sub-carrier from among the first plurality of sub-carriers by adding at least one weighted multiple of at least one other sub-carrier from among the first plurality of sub-carriers to the at least one sub-carrier;
receiving, by the multi-carrier receiver, a second symbol having a second plurality of sub-carriers; and
reducing, by the multi-carrier receiver, the error on the at least one sub-carrier by adding at least one weighted multiple of the second plurality of sub-carriers.

8. The method of claim 7, further comprising:
forcing at least one of the at least one weighted multiple of the at least one other sub-carrier to zero.

9. The method of claim 8, further comprising:
allowing twenty of the at least one weighted multiples of the at least one other sub-carrier corresponding to lowest tones to be non-zero.

10. The method of claim 8, further comprising:
allowing ten to twenty of the at least one weighted multiples of the at least one other sub-carrier to be non-zero and others of the at least one weighted multiples of the at least one other sub-carrier to be substantially zero.

11. The method of claim 7, further comprising:
training the at least one weighted multiple of the at least one other sub-carrier.

12. The method of claim 11, further comprising:
training the at least one weighted multiple of the at least one other sub-carrier using a least-mean squares algorithm.

13. The method of claim 7, wherein the at least one sub-carrier comprises a lowest used sub-carrier.

14. The method of claim 7, wherein the multi-carrier communication system is a digital subscriber line system.

15. The method of claim 7, wherein the first symbol is a current symbol in time and the second symbol is a previous symbol in time.

16. The method of claim 7, wherein the first symbol is a current symbol in time and the second symbol is a next symbol in time.

17. The method of claim 7, further comprising:
receiving a third symbol having a third plurality of sub-carriers; and
reducing the error on the at least one sub-carrier by adding at least one weighted multiple of the third plurality of sub-carriers.

18. The method of claim 17, wherein the first symbol is a current symbol in time, the second symbol is a previous symbol in time, and the third symbol is a next symbol in time.

19. The method of claim 7, wherein the at least one weighted multiple of the at least one other sub-carrier is represented by a first matrix having non-zero diagonal values.

20. The method of claim 19, wherein the at least one weighted multiple of the second plurality of sub-carriers is represented by a second matrix having at least one non-diagonal element being zero.

21. The method of claim 20, wherein the second matrix is restricted to having approximately 15×15 non-zero elements.

22. The method of claim 7, further comprising:
generating the first and the second plurality of sub-carriers using a discrete Fourier transform on a multi-tone signal of the communication system to convert data samples of the multi-tone signal from a time domain to a frequency domain.

* * * * *